US008582846B2

United States Patent
Li et al.

(10) Patent No.: US 8,582,846 B2
(45) Date of Patent: Nov. 12, 2013

(54) METHOD AND SYSTEM FOR VALIDATING IMAGE REGISTRATION

(75) Inventors: Guyu Li, Essen (DE); Li Zhang, Skillman, NJ (US); Christophe Chefd'hotel, Jersey City, NJ (US); Christoph Guetter, Lawrenceville, NJ (US)

(73) Assignee: Siemens Aktiengesellschaft, München (DE)

( * ) Notice: Subject to any disclaimer, the term of this patent is extended or adjusted under 35 U.S.C. 154(b) by 152 days.

(21) Appl. No.: 13/161,656

(22) Filed: Jun. 16, 2011

(65) Prior Publication Data

US 2011/0311115 A1 Dec. 22, 2011

Related U.S. Application Data

(60) Provisional application No. 61/356,255, filed on Jun. 18, 2010, provisional application No. 61/383,486, filed on Sep. 16, 2010, provisional application No. 61/407,482, filed on Oct. 28, 2010.

(51) Int. Cl.
*G06K 9/32* (2006.01)

(52) U.S. Cl.
USPC .......................................................... 382/128

(58) Field of Classification Search
None
See application file for complete search history.

(56) References Cited

U.S. PATENT DOCUMENTS

2005/0238253 A1* 10/2005 Behrenbruch et al. ........ 382/294

OTHER PUBLICATIONS

Zitova, Barbara, and Jan Flusser. "Image registration methods: a survey." Image and vision computing 21.11 (2003): 977-1000.*
Laliberté, France, Langis Gagnon, and Yunlong Sheng. "Registration and fusion of retinal images-an evaluation study." Medical Imaging, IEEE Transactions on 22.5 (2003): 661-673.*
Huang, Xishi, et al. "Dynamic 3D ultrasound and MR image registration of the beating heart." Medical Image Computing and Computer-Assisted Intervention-MICCAI 2005 (2005): 171-178.*
Tanner, Christine, et al. "Validation of volume-preserving non-rigid registration: Application to contrast-enhanced MR-mammography." Medical Image Computing and Computer-Assisted Intervention—MICCAI 2002 (2002): 307-314.*

* cited by examiner

*Primary Examiner* — Stephen R Koziol
*Assistant Examiner* — Amandeep Saini
(74) *Attorney, Agent, or Firm* — Donald B. Paschburg; F. Chau & Associates, LLC

(57) ABSTRACT

A method for validating non-rigid image registration includes acquiring a source image and a target image. Registration is performed from source image to target image using a non-rigid registration technique to produce forward transformation map. Registration is performed from the target image back to the source image using the non-rigid registration technique to produce a backward transformation map. Consistency registration error is measured as an indication of a change in local volume of the source with respect to the target image using the produced forward transformation map and the produced backward transformation map. The non-rigid registration technique is validated based on the measured consistency registration error.

20 Claims, 3 Drawing Sheets

METHOD AND SYSTEM FOR VALIDATING IMAGE REGISTRATION

CROSS-REFERENCE TO RELATED APPLICATION

The present application is based on provisional application Ser. Nos. 61/356,255, filed Jun. 18, 2010; 61/383,486, filed Sep. 16, 2010; and 61/407,482, filed Oct. 28, 2010, the entire contents of which are herein incorporated by reference.

BACKGROUND OF THE INVENTION

1. Technical Field

The present disclosure relates to registration validation and, more specifically, to methods and systems for validating non-rigid pulmonary image registration.

2. Discussion of Related Art

Registration is the process of identifying correspondence between multiple images. Within the field of medical imaging, registration of images may be used to combine image data across various imaging modalities, to compare an earlier-acquired image with a later-acquired image to determine change, or to compensate for patient motion over a long acquisition period or within a time series of medical images.

In motion compensation, registration may be used to associate anatomical structure from image frame to image frame, even as the relative size, shape and location of various anatomical elements changes as a result of such factors as respiration and cardiac cycle.

Where acquisition of a medical image requires several seconds or even several minutes to complete, motion compensation may be used to acquire the image even as cardiac motion continues. Motion compensation may also provide desirable results even in the absence of the subject holding breath.

Where multiple images are acquired as part of a time series, motion compensation may be used to provide a stable frame of reference so that various functional and/or pathological analyses may be more easily performed. For example, blood flow through pulmonary arteries may be more easily located and analyzed when the images over time are corrected for the respiratory motion.

There are multiple techniques available for performing image registration. Some techniques may provide better registration results than other techniques in various circumstances. As suboptimal registration may lead to poor results, it is often desirable to validate a registration to determine if the registration was well performed or if one registration algorithm is superior to the other in terms of different criteria.

However, it may be difficult to validate registration when the ground truth of how the anatomical structure shown within one image actually corresponds to the anatomical structure found within another image is not known. While in some instances it may be possible for an expert to manually provide this ground truth so that the registration may be more accurately validated, in certain situations, for example, the clinical setting and operation complexity, this option might not be practicable. Accordingly, methods for validating registration in the absence of knowledge of ground truth have been devised.

Consistency registration error (CRE) is one approach for validating registration in the absence of ground truth. This approach operates under the assumption that if a forward registration is determined (in which a first image is registered to a second image) and then a backward registration is determined (in which the second image is back-registered to the first image using the same registration technique), a successful registration technique for that particular age set should be able to move a given pixel from the domain of the first image to the domain of the second image using the forward registration and then move the pixel back to the domain of the first image using the backward registration such that the original location of the given pixel is not different from the new location of the given pixel after the forward and backward registrations are applied in sequence. In practice, CRE is computed as the distance between the original position of a point and the transformed position of the point after forward and backward registration. The smaller the difference the more consistent the registration is.

SUMMARY

A method for validating non-rigid image registration includes acquiring a source image and a target image. Registration is performed from source image to target image using a non-rigid registration technique to produce forward transformation map. Registration is performed from the target image back to the source image using the non-rigid registration technique to produce a backward transformation map. Consistency registration error is measured as an indication of a change in local volume of the source with respect to the target image using the produced transformation map and the produced backward transformation map. The non-rigid registration technique is validated based on the measured consistency registration error.

The volume consistency registration error may be measured using a Jacobian matrix of the forward transformation map or the backward transformation map. The registration error may be measured as $VCRE = \log|D(\phi \circ \psi)| + \log|D\psi|$ or $VCRE = \log|D(\psi \circ \phi)| + \log|D\phi|$ wherein $\phi$ represents the forward transformation map, $\psi$ represents the backward transformation map, $D(x)$ represents the Jacobian matrix of x, and $|D(x)|$ represents the determinant of the Jacobian matrix of x.

The source and target image may be part of a time series of medical images. The time series of medical images may be a pulmonary time series.

The measured consistency registration error may be calculated for an image pair. For a time series, one image will be picked up as target image and the rest images will be used as source image. Thus a single value $\epsilon$ is determined from a sequence of calculated consistency registration errors after using certain statistics such as root mean square. Using the same procedure a sequence of values $\epsilon$ can be produced for several time series. The sequence of values $\epsilon$ may be transformed into the frequency domain using Fourier transform and the resulting spectrum is analyzed to determine whether there is a predominant peak showing in the frequency domain. Analysis of the spectrum to determine whether there is a predominant peak frequency or how predominant the peak frequency is may be performed by calculating a peak-to-base frequency ratio. The determination as to whether there is a peak frequency may be considered in validating the non-rigid registration technique. The peak-to-base frequency ratio may be considered in validating the non-rigid registration technique. A relatively large peak-to-base frequency ratio may be used to determine that the non-rigid registration technique is less suitable to compensate the motion while a relatively small peak-to-base frequency ratio is used to determine that the non-rigid registration technique can achieve a good motion compensation.

Validating the non-rigid registration technique based on the measured consistency registration error may include determining whether the non-rigid registration technique is sensitive to periodic motion.

A method for validating non-rigid image registration includes acquiring a sequence of images. Several source images and a target image are identified within the sequence of images. Registration is performed from the source image to the target image using a non-rigid registration technique to produce forward transformation map. Registration is performed from the target image back to the source image using the non-rigid registration technique to produce a backward transformation map. A point-wise registration error is measured for a plurality of image pairs using the produced forward transformation map and the produced backward transformation map. The measured point-wise registration error is represented for the plurality of image pairs using a single value $\epsilon$ after using certain statistics. A value $\epsilon$ is determined for a plurality of source and target images within the sequence of images to generate a series of $\epsilon$ values. The series of $\epsilon$ values is transformed into the frequency domain to produce a spectrum. It is determined whether there is a predominant peak frequency within the spectrum. The non-rigid registration technique is validated based on whether there is a predominant peak frequency within the spectrum.

The consistency registration error may be measured using a Jacobian matrix of the forward transformation map or the backward transformation map. The registration error may be measured as VCRE=log|D($\phi \circ \psi$)|+log|D$\psi$| or VCRE=log|D($\psi \circ \phi$)|+log|D$\phi$| wherein $\phi$ represents the forward transformation map, $\psi$ represents the backward transformation map, D(x) represents the Jacobian matrix of x, and |D(x)| represents the determinant of the Jacobian matrix of x.

Determining whether there is a predominant peak frequency or how predominant the peak frequency is may be performed by calculating a peak-to-base frequency ratio for the spectrum. A relatively large peak-to-base frequency ratio may be used to determine that the non-rigid registration technique is less suitable to compensate the motion while a relatively small peak-to-base frequency ratio may be used to determine that the non-rigid registration technique can achieve a good motion compensation.

A computer system includes a processor and a non-transitory, tangible, program storage medium, readable by the computer system, embodying a program of instructions executable by the processor to perform method steps for validating non-rigid image registration. The method includes acquiring a source image and a target image. Registration is performed from source image to target image using a non-rigid registration technique to produce forward transformation map. Registration is performed from the target image back to the source image using the non-rigid registration technique to produce a backward transformation map. Consistency registration error is measured using the produced forward transformation map and the produced backward transformation map. It is determined whether the non-rigid registration technique is sensitive to periodic motion using the measured consistency registration error. The non-rigid registration technique is validated based on whether the non-rigid registration technique is sensitive to periodic motion.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
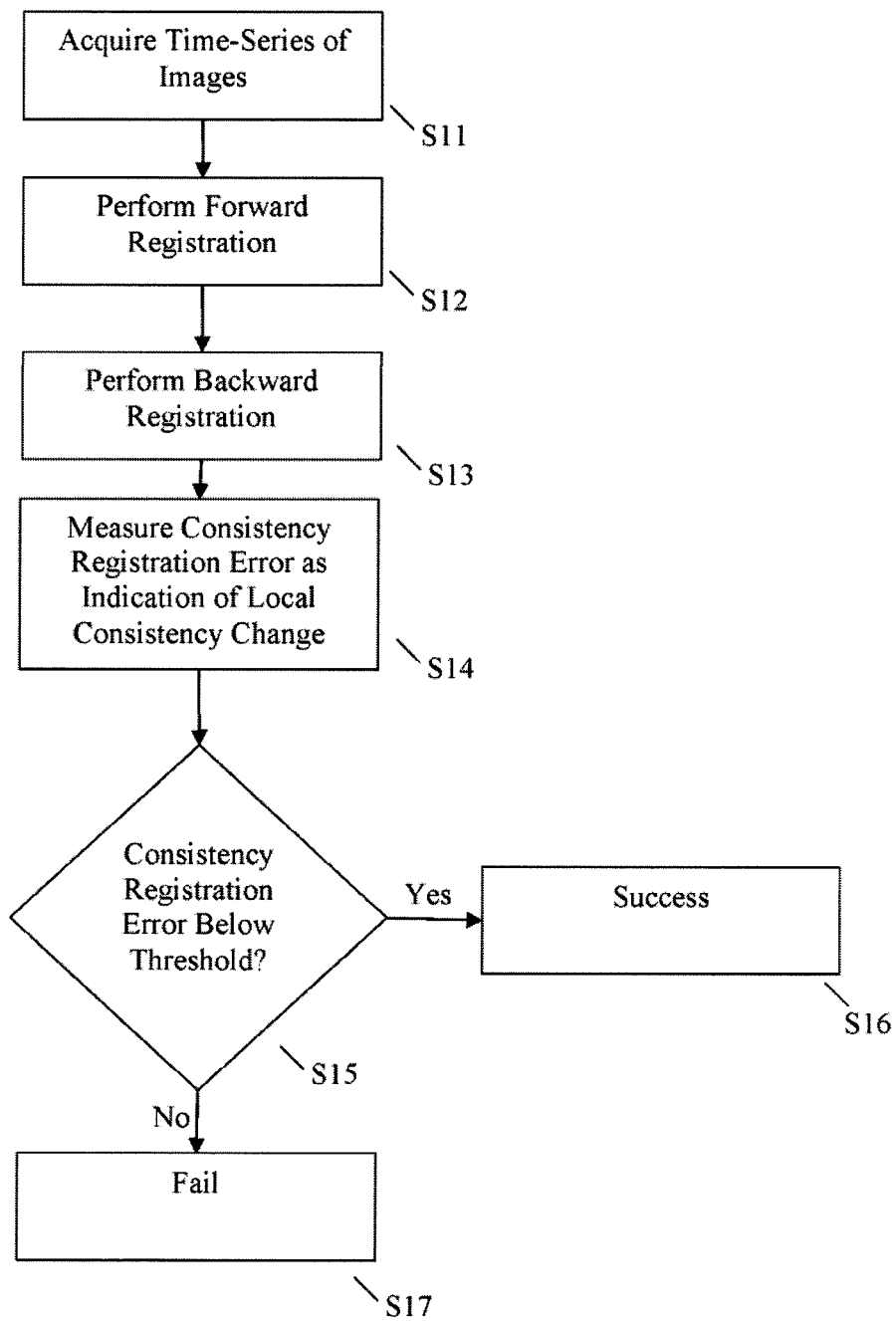
FIG. 1 is a flow chart illustrating a method for validating nonrigid pulmonary image registration according to an exemplary embodiment of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide systems and methods for validating the effectiveness of image registration in the absence of knowledge of the ground truth mapping between images. Rather than using the conventional CRE approach, exemplary embodiments of the present invention provide an approach for volume change consistency (VCRE). In the CRE approach, a registration algorithm or techniques is used to map a source image S to a target image T. The resulting transformation map $\phi$ represents how S is changed to arrive at T. The same registration algorithm or technique is then used to map the target image T back to the source image S. The resulting transformation map $\psi$ represents how T is changed to arrive at S. A nonrigid registration algorithm may then be validated if an only if $\psi$ is equal to the inverse of $\phi$ and $\phi$ is equal to the inverse of $\psi$, which may be expressed as $\phi = \psi^{-1}$ or $\psi = \phi^{-1}$.

The CRE may accordingly be calculated as follows:

$$\text{CRE} = \|\phi \circ \psi - id\|_2 \tag{1}$$

Here, $\|\ldots\|_2$ represents the standard Euclidian norm and id represents the original position of points on the image domain before deformation.

Exemplary embodiments of the present invention provide for a VCRE approach in which a Jacobian map-based consistency measure is applied. The Jacobian matrix is a matrix representing all first-order partial derivatives of a vector with respect to another vector. Here, the Jacobian matrix of $\phi$ may be expressed as D$\phi$ and its determinant |D$\phi$| may indicate the local volume change of the source with respect to the target image. According to the definition of consistency:

given $\phi \circ \psi = id$ $\rightarrow D(\phi \circ \psi) \cdot D\psi = I$ $|D(\phi \circ \psi)| \cdot |D\psi| = 1$ $\log|D(\phi \circ \psi)| + \log|D\psi| = 0$ $\rightarrow \text{VCRE} = \log|D(\phi \circ \psi)| + \log|D\psi|$ or $$\text{VCRE} = \log|D(\psi \circ \phi)| + \log|D\phi| \tag{2}$$

Logarithm of Jacobian values may be used in this analysis to provide a normalized expansion and contraction rate. Here I represent the identity matrix. For an ideally consistent registration, the product of forward and backward Jacobian maps should yield identity and accordingly, VCRE as defined herein should equal zero. As the VCRE is computed over a local neighborhood, this measure may be less affected but the value of displacement vector of an individual point and accordingly may provide for a more reliable analysis of registration validation.

One example of a medical image time series is the pulmonary time series. In this series of medical images, the process of respiration is represented. Registration may be performed to map each of the medical images within the time series so that lung perfusion and ventilation may be better understood. However, as some registration techniques may be sensitive to e.g. respiratory motion, and accordingly, registration of the various image pairs may be performed inconsistently. Accordingly, exemplary embodiments of the present invention seek to validate a registration, at least in part, based on a calculated sensitivity-to-motion of the registration. This technique may be used either in conjunction with or apart from the consistency error measure of registration validation described in detail above, however, this technique may be described herein in conjunction with CRE.

Exemplary embodiments may calculate sensitivity-to-motion as follows:

Let $\epsilon_{CRE}$ denote a statistical operator (e.g. root mean square) of CRE for an image pair of a time series. To characterize an extent to which nonrigid registration algorithms are dependent on the breathing pattern, a Fourier transform (FT) may be applied to all $\epsilon_{CRE}$ in the time series:

$$\varepsilon_{CRE}(n) FT \overset{FT}{\rightarrow} E_{CRE}(2\pi f), \quad (3)$$

Here, n may represent the index of the image pair and f may represent the frequency in Hz. When a nonrigid registration algorithm is not symmetric, then $E_{VCRE}(2\pi f)$ should reveal a predominant peak in the frequency domain. If, however, a nonrigid registration algorithm is ideally symmetric, then the spectrum of $E_{CRE}(2\pi f)$ should be evenly distributed and there might be no discernable outlying peaks.

A peak-to-base frequency ratio may be defined as $$\rho = \frac{f_{HMW}}{f_{base}}.$$

The peak-to-base frequency ratio may represent the proportion of average energy within the half maximum width ($f_{HMW}$) to the average energy in the rest area ($f_{base}$). This measure may be used to quantitatively show how strong the consistency of a nonrigid registration algorithm is dependent on respiratory motion. If, for example, $\rho \gg 1$, then VCRE may be strongly dependent on periodic motion. After statistically comparing $\rho$ of different nonrigid registration algorithms, an algorithm resulting in a relatively large $\rho$ may be considered as more sensitive to respiratory motion. As a registration algorithm suitable for registering medical image time series should be relatively insensitive to periodic motion, an algorithm that is determined to be sensitive to respiratory motion may be not suitable for registering the lung data while a registration algorithm that is relatively insensitive to motion may be deemed to be suitable for registering the lung data. Accordingly, validation of a registration algorithm may depend, not only on the magnitude of the computed consistency error such as VCRE, but also on a measure of sensitivity-to-motion based on the consistency error.

FIG. 1 is a flow chart illustrating a method for validating nonrigid pulmonary image registration according to an exemplary embodiment of the present invention. However, it is to be understood that the described approach may be applied more broadly to the validation of any nonrigid image registration and the validation of nonrigid pulmonary image registration is offered as an example because the proposed approach may be well suited for application to cases in which periodic motion is present such as the breathing motion found in pulmonary image sets.

First, a time series of medical images may be acquired (Step S11). The time series may include a sequence of image frames, with each frame encompassing the region of interest, which in this particular example, is the pulmonary region. The plurality of image frames may include a source image S and a target image T. In practice, a user-defined target image will be picked up among the image frames and the rest images may be used as source images. Validation of registration may be performed by analyzing each and every image pair; however, for the purposes of validating a particular registration algorithm, there may be at least one source image S and one target image T.

The image registration algorithm to be verified may then be utilized to register the source image S to the target image T (Step S12). The result of this registration may be a forward transformation map $\phi$. Then, the image registration algorithm may be utilized to register the target image T back to the source image S and a backward transformation map $\psi$ may accordingly be generated (Step S13). A measure of pointwise consistency registration error may then be computed as an indication of volume change of an infinitely small area on the source image after the forward and backward registration to the target image (Step S14). This indication of the local volume change may be based on a Jacobian matrix of one or more of the forward transformation map and the backward transformation map. For example, the measure of consistency registration error may be related to a logarithm of a determinant of a Jacobian matrix of a product of the forward transformation map and the backward transformation map plus a logarithm of the backward transformation map or a logarithm of a determinant of a Jacobian matrix of a product of the backward transformation map and the forward transformation map plus a logarithm of the forward transformation map. For example, the measure of registration error may be computed in accordance with equation (2).

Here, the determinant of the Jacobian matrix of a transformation map may be equal to one where there is no change, greater than one where there is expansion, and less than one and greater than zero where there is contraction. Moreover, a value approaching infinity may indicate tearing while a value less than zero may indicate folding.

The computed consistency registration error may then be used to validate the registration (Step S15). For example, where the registration error is below a predetermined threshold (Yes, Step S15), the registration algorithm used may be successful (Step S16). However, where the consistency registration error is above a predetermined threshold (No, Step S15), the registration algorithm may considered to be failed (Step S17).

Validation of the registration may have many different practical uses. For example, validation of registration may be used to reject a registration, to select between competing registrations by determining relative validity, or to iteratively improve a registration algorithm by minimizing the measure of registration error.

Figure 2:
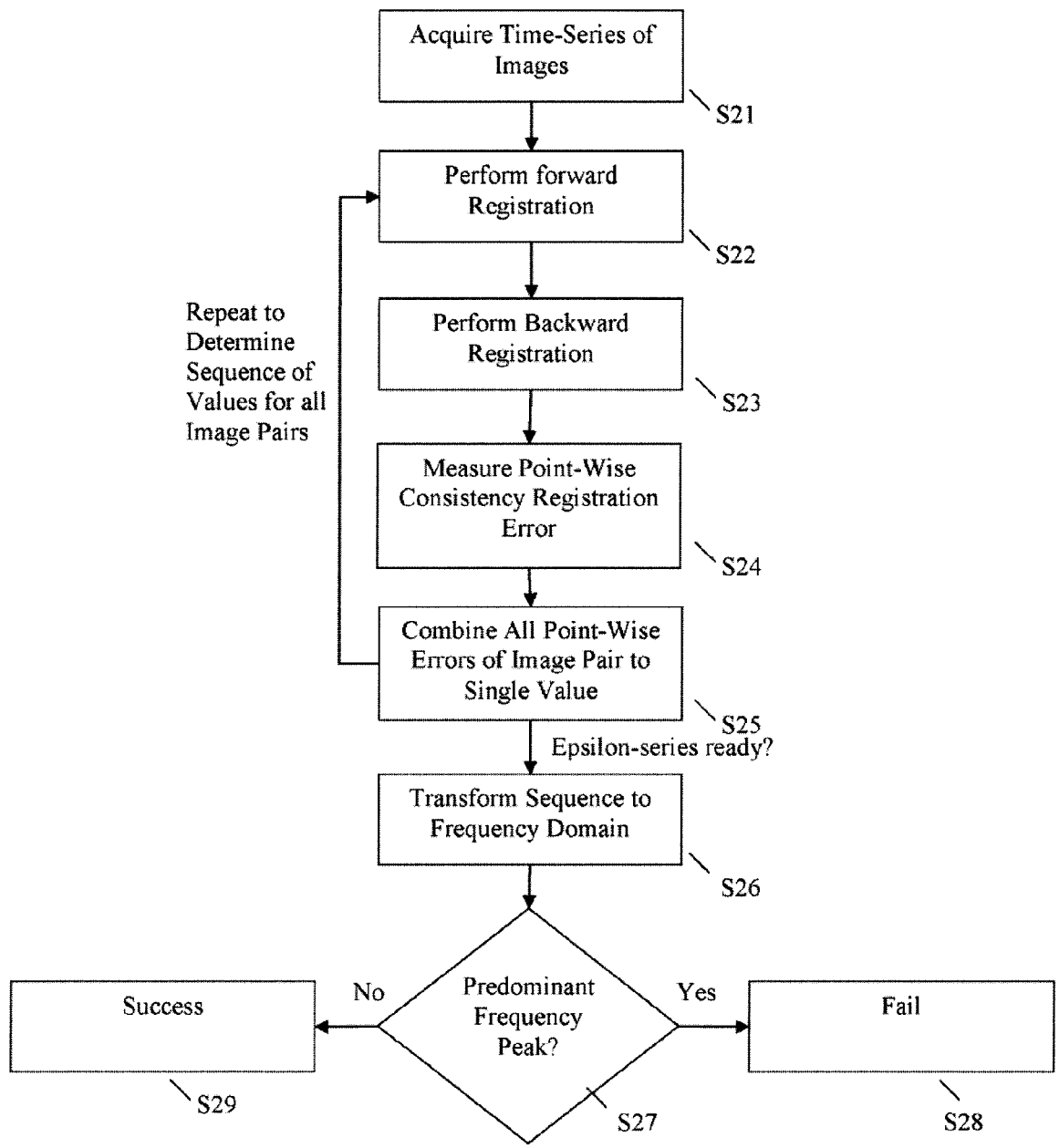
FIG. 2 is a flow chart illustrating a method for performing sensitivity-to-motion analysis according to an exemplary embodiment of the present invention.

Regardless of whether consistency registration error is calculated in accordance with one of the approaches for calculating VCRE described above or in accordance with a conventional approach for calculating CRE, sensitivity-to-motion analysis may be performed. FIG. 2 is a flow chart illustrating a method for performing sensitivity-to-motion analysis according to an exemplary embodiment of the present invention.

First, a time series of medical images may be acquired (Step S21). The image registration algorithm to be verified may then be utilized to register the source image S to the target image T and a forward transformation map $\phi$ may accordingly be generated (Step S22). Then, the image registration algorithm may be utilized to register the target image T back to the source image S and a backward transformation map $\psi$ may accordingly be generated (Step S23). A consistency registration error value may then be computed based on the forward and backward transformation maps $\phi$ and $\psi$ (Step S24). The consistency registration error value may be a VCRE described above or a CRE. The consistency registration error value may be a point-wise value representing a measure error attributable to a single point. The point-wise values for the entire image pair may then be combined into a single value $\epsilon$, for example, using statistical methods such as calculating the root mean square for the entire set of point-wise values in the image pair (Step S25). Steps S22-S25 may be repeated for every image pair within the image sequence to provide a sequence of $\epsilon$ values. This sequence may then be transformed into the frequency domain, for example, by performing a Fourier transform, to generate a spectrum of values E (Step S26). Validation of the registration may then be performed by analyzing the spectrum values E to determine if there is a predominant peak frequency showing in the frequency domain (Step S27). If a predominant peak frequency is apparent (Yes, Step S27) then the registration may fail to do the motion correction (Step S28), however, if the spectrum is relatively evenly distributed (No, Step S27) then the registration may have achieved a good motion compensation (Step S29). Analysis of the spectrum values E may include calculation of a peak-to-base frequency ratio and a predominant peak frequency may be judged to be apparent where the peak-to-base frequency ratio exceeds a predetermined threshold. Alternatively other approaches may be used to determine whether a predominant peak frequency is apparent, for example, by visually inspecting the spectrum of values E. The registration performance on motion correction of two or more registration algorithms can be compared using either visual inspection on the spectra or the results of peak-to-base frequency ratio.

The approach for calculating the VCRE as described above with respect to FIG. 1 may be applied as the consistency registration error value used according to the approach for performing sensitivity-to-motion analysis described above with respect to FIG. 2.

Figure 3:
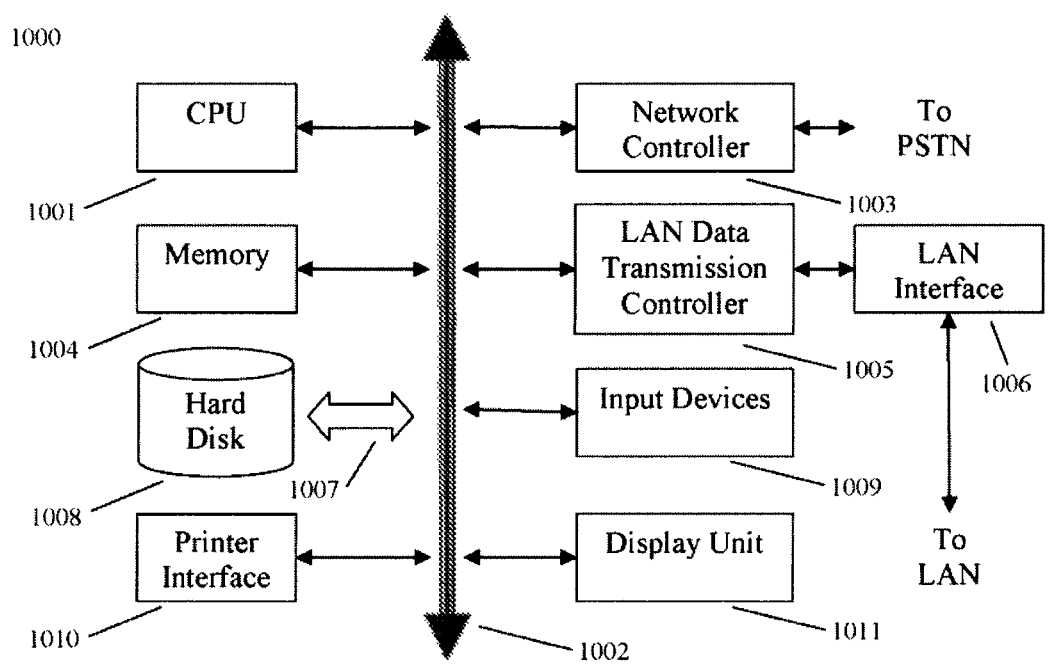
FIG. 3 shows an example of a computer system capable of implementing the method and apparatus according to embodiments of the present disclosure.

FIG. 3 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for validating non-rigid image registration, comprising:

acquiring a source image and a target image;

performing a first registration from source image to target image using a non-rigid registration technique to produce a forward transformation map;

performing a second registration from the target image back to the source image using the non-rigid registration technique to produce a backward transformation map;

measuring consistency registration error as an indication of a change in local volume of the source with respect to the target image using the produced forward transformation map and the produced backward transformation map; and validating the non-rigid registration technique based on the measured consistency registration error, wherein the measured consistency registration error is calculated for the source image and the target image, within a time series of images, to produce a sequence of values and a spectrum of the sequence of values are analyzed, in the frequency domain, to determine whether there is a peak frequency.

2. The method of claim 1, wherein the registration error is measured using a Jacobian matrix of the forward transformation map or the backward transformation map.

3. The method of claim 1, wherein the consistency registration error is measured as VCRE=log|D($\phi\circ\psi$)|+log|D$\psi$| or VCRE=log|D($\psi\circ\phi$)|+log|D$\phi$| wherein $\phi$ represents the forward transformation map, $\psi$ represents the backward transformation map, D(x) represents the Jacobian matrix of x, and |D(x)| represents the determinant of the Jacobian matrix of x.

4. The method of claim 1, wherein the source and target image are part of a time series of medical images.

5. The method of claim 4, wherein the time series of medical images is a pulmonary time series.

6. The method of claim 4, wherein the time series of medical images is a cardiac time series.

7. The method of claim 1, wherein the measured consistency registration error is calculated for a plurality of image pairs within the source and target image and a single value $\epsilon$ is determined from the plurality of calculated consistency registration errors.

8. The method of claim 7, wherein the measured consistency registration error is calculated for a plurality of source images and the target image within a time series of images to produce a sequence of values $\epsilon$.

9. The method of claim 1, wherein validating the non-rigid registration technique based on the measured consistency registration error includes determining whether the non-rigid registration technique is sensitive to periodic motion.

10. A method for validating non-rigid image registration, comprising:

acquiring a source image and a target image;

performing registration from source image to target image using a non-rigid registration technique to produce a forward transformation map;

performing registration from the target image back to the source image using the non-rigid registration technique to produce a backward transformation map;

measuring consistency registration error as an indication of a change in local volume of the source with respect to the target image using the produced forward transformation map and the produced backward transformation map; and validating the non-rigid registration technique based on the measured consistency registration error, wherein the measured consistency registration error is calculated for a plurality of image pairs within the source and target image and a single value $\epsilon$ is determined from the plurality of calculated consistency registration errors, wherein the measured consistency registration error is calculated for a plurality of source images and the target image within a time series of images to produce a sequence of values $\epsilon$, and wherein the sequence of values $\epsilon$ is transformed into the frequency domain and the resulting spectrum is analyzed to determine whether there is a predominant peak frequency.

11. The method of claim 10, wherein analysis of the spectrum to determine whether there is a predominant peak frequency is performed by calculating a peak-to-base frequency ratio.

12. The method of claim 11, wherein the peak-to-base frequency ratio is considered in validating the non-rigid registration technique.

13. The method of claim 12, wherein a relatively large peak-to-base frequency ratio is used to determine that the non-rigid registration technique can perform acceptable motion compensation while a relatively small peak-to-base frequency ratio is used to determine that the non-rigid registration technique has failed to perform acceptable motion compensation.

14. The method of claim 10, wherein the determination as to whether there is a predominant peak frequency is considered in validating the non-rigid registration technique.

15. A method for validating non-rigid image registration, comprising:

acquiring a sequence of images;

identifying a source image and a target image within the sequence of images;

performing registration from the source image to the target image using a non-rigid registration technique to produce forward transformation map;

performing registration from the target image back to the source image using the non-rigid registration technique to produce a backward transformation map;

measuring point-wise consistency registration error for a plurality of image pairs using the produced forward transformation map and the produced backward transformation map;

representing the measured point-wise consistency registration error for the plurality of image pairs using a single value $\epsilon$;

determining a value $\epsilon$ for a plurality of source images and the target image within the sequence of images to generate a series of $\epsilon$ values;

transforming the series of $\epsilon$ values into the frequency domain to produce a spectrum;

determining whether there is a predominant peak frequency or how predominant a peak frequency is within the spectrum; and validating the non-rigid registration technique based on whether there is a predominant peak frequency or how predominant the peak frequency is within the spectrum.

16. The method of claim 15, wherein the consistency registration error is measured using a Jacobian matrix of the forward transformation map or the backward transformation map.

17. The method of claim 15, wherein the registration error is measured as $VCRE=\log|D(\phi \circ \psi)|+\log|D\psi|$ or $VCRE=\log|D(\psi \circ \phi)|+\log|D\phi|$ wherein $\phi$ represents the forward transformation map, $\psi$ represents the backward transformation map, $D(x)$ represents the Jacobian matrix of x, and $|D(x)|$ represents the determinant of the Jacobian matrix of x.

18. The method of claim 15, wherein determining whether there is a predominant peak frequency is performed by calculating a peak-to-base frequency ratio for the spectrum.

19. The method of claim 18, wherein a relatively large peak-to-base frequency ratio is used to determine that the non-rigid registration technique has failed to adequately perform motion compensation while a relatively small peak-to-base frequency ratio is used to determine that the non-rigid registration technique has achieved a good motion compensation.

20. A computer system comprising:

a processor; and a non-transitory, tangible, program storage medium, readable by the computer system, embodying a program of instructions executable by the processor to perform method steps for validating non-rigid image registration, the method comprising:

acquiring a source image and a target image;

performing a first registration from source image to target image using a non-rigid registration technique to produce forward transformation map;

performing a second registration from the target image back to the source image using the non-rigid registration technique to produce a backward transformation map;

measuring consistency registration error using the produced forward transformation map and the produced backward transformation map;

determining whether the non-rigid registration technique is sensitive to periodic motion using the measured consistency registration error; and validating the non-rigid registration technique based on whether the non-rigid registration technique is sensitive to periodic motion, wherein the measured consistency registration error is calculated for the source image and the target image, within a time series of images, to produce a sequence of values and a spectrum of the sequence of values are analyzed, in the frequency domain, to determine whether there is a peak frequency.

* * * * *